(12) United States Patent
Kamath (10) Patent No.: US 10,841,289 B2
(45) Date of Patent: Nov. 17, 2020

(54) MOBILE DEVICES AS SECURITY TOKENS

(71) Applicant: Digimarc Corporation, Beaverton, OR (US)

(72) Inventor: Ajith Kamath, Beaverton, OR (US)

(73) Assignee: Digimarc Corporation, Beaverton, OR (US)

(*) Notice: Subject to any disclaimer, the term of this patent is extended or adjusted under 35 U.S.C. 154(b) by 1275 days.

(21) Appl. No.: 13/846,351

(22) Filed: Mar. 18, 2013

(65) Prior Publication Data
US 2014/0279493 A1   Sep. 18, 2014

(51) Int. Cl.
| | |
|---|---|
| *G06Q 20/00* | (2012.01) |
| *H04L 29/06* | (2006.01) |
| *G07F 19/00* | (2006.01) |
| *G06Q 20/32* | (2012.01) |
| *H04W 12/00* | (2009.01) |

(52) U.S. Cl.
CPC ......... *H04L 63/08* (2013.01); *G06Q 20/3274* (2013.01); *G06Q 20/3276* (2013.01); *G07F 19/20* (2013.01); *H04W 12/00522* (2019.01)

(58) Field of Classification Search
USPC ........................................................ 706/76
See application file for complete search history.

(56) References Cited

U.S. PATENT DOCUMENTS

| | | |
|---|---|---|
| 6,776,331 B2 | 8/2004 | Plummer |
| 7,043,048 B1 | 5/2006 | Ellingson |
| 7,123,740 B2 | 10/2006 | McKinley |
| 7,503,488 B2 | 3/2009 | Davis |
| 8,103,877 B2 | 1/2012 | Hannigan et al. |
| 8,116,685 B2 | 2/2012 | Bregman-Amitai et al. |
| 8,261,089 B2 | 9/2012 | Leon Cobos et al. |
| 8,294,569 B2 | 10/2012 | Thorn et al. |
| 8,296,686 B1 | 10/2012 | Tedesco et al. |
| 8,429,407 B2 | 4/2013 | Os et al. |

(Continued)

OTHER PUBLICATIONS

Bangerter, A Demonstrative Ad Hoc Attestation System, LNCS 5222, pp. 17-30, 2008.

(Continued)

*Primary Examiner* — Patrick McAtee
*Assistant Examiner* — John M Winter
(74) *Attorney, Agent, or Firm* — Digimarc Corporation (57) ABSTRACT

A person's smartphone serves as a security token—used variously to establish the user's authorization, and to test the bona fides of the counter-party system. In one illustrative ATM arrangement, a bank's computer system and the user's smartphone share secret information across a network. The smartphone employs this shared secret to generate a corresponding image, which is displayed on its screen. The displayed image is sensed by a camera in the ATM, which sends corresponding data back to the bank computer system. The bank computer system analyzes the received data and responds by sending information to the ATM authorizing a transaction. By such arrangement, authentication of the transaction involves one-way optical communication of visual information between the ATM and the smartphone, and two-way network communication of information between the ATM and the bank computer system. A great number of other features and arrangements are also detailed.

22 Claims, 4 Drawing Sheets

(56) References Cited

U.S. PATENT DOCUMENTS

| | | | |
|---|---|---|---|
| 8,498,627 | B2 | 7/2013 | Rodriguez |
| 8,935,777 | B2 | 1/2015 | DeSoto et al. |
| 9,026,797 | B2 | 5/2015 | Yi |
| 9,027,085 | B2 | 5/2015 | Kulu |
| 9,628,875 | B1 | 4/2017 | Roth et al. |
| 9,639,825 | B1 | 5/2017 | Roth et al. |
| 2003/0047613 | A1 | 3/2003 | Funamoto et al. |
| 2005/0111723 | A1 | 5/2005 | Hannigan et al. |
| 2005/0220321 | A1* | 10/2005 | Langelaar ............ G06T 1/0028 382/100 |
| 2007/0079135 | A1 | 4/2007 | Saito |
| 2007/0174613 | A1 | 7/2007 | Paddon et al. |
| 2008/0040285 | A1* | 2/2008 | Wankmueller ......... G06Q 20/32 705/67 |
| 2009/0061837 | A1 | 3/2009 | Chaudhri et al. |
| 2009/0085873 | A1 | 4/2009 | Betts et al. |
| 2011/0176706 | A1 | 7/2011 | Levy |
| 2011/0187652 | A1 | 8/2011 | Huibers |
| 2011/0191438 | A1 | 8/2011 | Huibers et al. |
| 2011/0191823 | A1 | 8/2011 | Huibers |
| 2011/0251892 | A1 | 10/2011 | Laracey |
| 2011/0293094 | A1 | 12/2011 | Os et al. |
| 2011/0295502 | A1 | 12/2011 | Faenger |
| 2011/0314549 | A1 | 12/2011 | Song et al. |
| 2012/0054046 | A1* | 3/2012 | Albisu .................. G06Q 20/20 705/16 |
| 2012/0096277 | A1 | 4/2012 | Perez Soria |
| 2012/0138679 | A1 | 6/2012 | Doyle |
| 2012/0150790 | A1 | 6/2012 | Angell et al. |
| 2012/0187187 | A1 | 7/2012 | Duff et al. |
| 2012/0221687 | A1 | 8/2012 | Hunter et al. |
| 2012/0265809 | A1 | 10/2012 | Hanson et al. |
| 2012/0278155 | A1 | 11/2012 | Faith |
| 2013/0185210 | A1 | 7/2013 | Dodson et al. |
| 2014/0013100 | A1 | 1/2014 | Menzel et al. |
| 2014/0106710 | A1 | 4/2014 | Rodriguez |
| 2014/0180777 | A1 | 6/2014 | Moshrefi et al. |
| 2014/0189799 | A1 | 7/2014 | Lu |
| 2014/0244494 | A1 | 8/2014 | Davis et al. |

OTHER PUBLICATIONS

D'Alessandro et al, SC-CCO—A Graphic-Based Authentication System, Eurosec 2008, pp. 8-15.

Dodson, Snap2Pass—Consumer-Friendly Challenge Response Authentication with a Phone, 2010.

Fang, Securing Interactive Sessions Using Mobile Device through Visual Channel and Visual Inspection, 2010.

Ion et al, Don't Trust POS Terminals—Verify In-Shop Payments with your Phone, Proceedings of SMPU 2010.

Starnberger et al, QR-TAN, Secure Mobile Transaction Authentication, 2009.

Vapen, 2-clickAuth Optical Challenge-Response Authentication, IEEE Int'l Conf on Availability, Reliability, and Security (ARES), 2010, pp. 79-86.

Mizuno, Authentication Using Multiple Communication Channels, Proc. of 2005 ACM Workshop on Digital Identity, pp. 54-62.

Claycomb, et al, Secure real world interaction using mobile devices, Proc. PERMID, 2006.

McCune, et al, Seeing-is-believing: Using camera phones for human-verifiable authentication, Int. J. Security and Networks, vol. 4, Nos. 1-2, 2009, pp. 43-56.

Batyuk, et al, Multi-device key management using visual side channels in pervasive computing environments, 2011 IEEE Int'l Conf. on Broadband and Wireless Computing, Communication and Applications (BWCCA), pp. 207-214.

Dodson, et al, Secure, consumer-friendly web authentication and payments with a phone, Int'l Conf. on Mobile Computing, Applications, and Services, 2010, pp. 17-38.

Scott, et al, Using visual tags to bypass Bluetooth device discovery, ACM SIGMOBILE Mobile Computing and Communications Review, Jan. 2005, pp. 41-53.

* cited by examiner

MOBILE DEVICES AS SECURITY TOKENS

TECHNICAL FIELD

The present technology concerns use of smartphones and other mobile devices as security tokens, e.g., in trusted transactions with other systems.

Introduction

With the proliferation of man-machine transactions, it is vitally important for each party to be able to trust the other—to be assured that the counterparty is authentic, and that the transaction is secure.

A familiar example is a person withdrawing cash from an ATM machine. A plastic card and a four digit PIN code do not comprise a robust security system. (Things were different 40 years ago, when the current ATM usage model was introduced.)

Moreover, the issue is not simply whether the machine can trust the human; the trustworthiness of the machine should also be questioned. There are increasing reports about false-fronts ATMs and self-service gas pumps, which read data from a user's bank card and harvest the user's PIN code—to be repurposed later for fraudulent purposes.

In accordance with certain embodiments of the present technology, a person's smartphone serves as a security token—used variously to establish the user's authorization, and to test the bona fides of the counter-party system.

In one illustrative arrangement, a bank's computer system and the user's smartphone share secret information across a network. The smartphone employs this shared secret to generate a corresponding image, which is displayed on its screen. The displayed image is sensed by a camera in the ATM, which sends corresponding data back to the bank computer system. The bank computer system analyzes the received data and responds by sending information to the ATM authorizing a transaction. By such arrangement, authentication of the transaction involves one-way optical communication of visual information between the ATM and the smartphone, and two-way network communication of information between the ATM and the bank computer system.

While this example—and most that follow—particularly concern ATM transactions, it will be recognized that this is for purposes of expository convenience. The technology is much more broadly applicable.

The foregoing and other features and advantages of the present technology will be more readily apparent from the detailed description, which proceeds by reference to the accompanying drawings.

DETAILED DESCRIPTION

Figure 1:
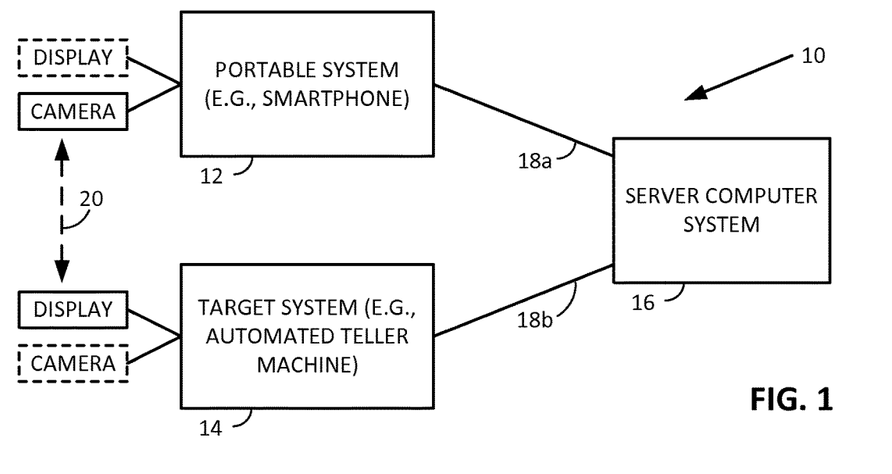
FIG. 1 shows various systems involved in an exemplary embodiment of the present technology.

An illustrative embodiment 10 that includes certain features of the technology is shown in FIG. 1. This embodiment includes a user's portable system 12, a target system 14, and a server computer system 16. The portable system 12 can comprise, e.g., a smartphone. The target system 14 can comprise, e.g., a bank's automated teller machine (ATM). The server computer system 16 can comprise a bank computer that helps govern operation of the target system (ATM) 14.

The server computer system 16 communicates with the other systems across network connections—shown by solid lines 18a and 18b. The portable system 12 and the target system 14 communicate differently—such as by optical communications (indicated by the dashed arrow).

In a first particular embodiment, the target system 14 includes a display portion, which presents an image that is sensed by a camera portion of the portable system 12. In a second particular embodiment, the display and camera portions are reversed, with the portable system 12 including a display portion, which presents an image that is sensed by a camera portion of the target system 14.

Figure 2:
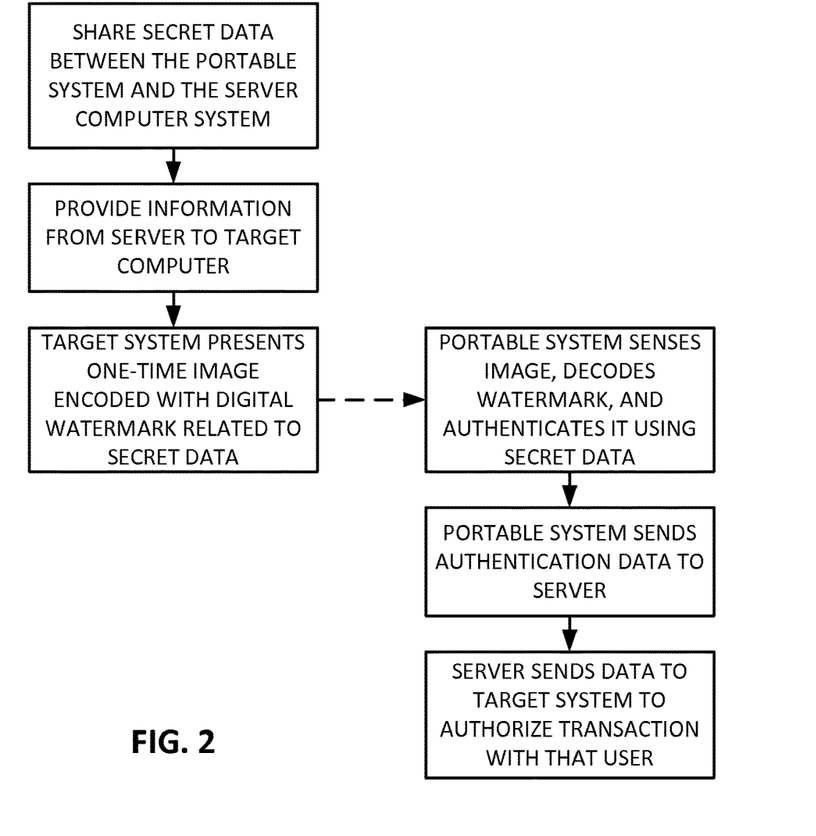
FIGS. 2 and 3 show flow charts of an illustrative method.

The first particular embodiment can employ a method such as is detailed in the flowchart of FIG. 2.

In this arrangement, the portable system 12 and the server computer system 16 communicate to share a secret. The secret can comprise, for example, a seed value for a random number generator, from which each system can independently create the same sequence of pseudo random numbers. Alternatively, the secret data can comprise a random number (e.g., 128 bits). In any event, the portable system and the server computer system share some common state information.

The server 16 then generates watermark data that is dependent on this state information, and provides this information across the network 18b to the target system.

In an exemplary arrangement, this watermark data comprises a plural-bit data payload that is a function of the secret data. For example, it can be an exclusive-OR (XOR) operation between the secret data and a pseudo-random number (PRN-1) generated by the server system for this particular transaction. In another arrangement, this watermark data defines a location mapping function by which other payload data is placed into a watermark pattern, or it comprises a cryptographic key that is necessary to decode payload information encoded into the watermark.

The target system 14 receives this information from the server system and uses it to generate a digitally watermarked image that it presents using the display of the target system. The host image into which the digital watermark is encoded can be a static image (e.g., a bank logo) or it can be an image that varies over time, or with different users. (For example, it can be a SiteKey image that the user earlier selected to denote that user's account.) When watermarked, this image becomes effectively serialized, or unique—and serves as a one-time authentication component of the transaction between the user and the target system.

(In a variant arrangement, the target system 14 does not generate a watermarked image. Instead, this operation is performed by the server system 16, which transmits the watermarked image to the target system for display.)

Continuing with the right half of FIG. 2, the portable system 12 senses the image from the target system using a camera arrangement. The resulting image data is then processed to generate authentication information—by applying the secret data (or a derivative thereof) in some manner.

In one particular example, in which the watermark payload comprises the secret data XOR'd with the pseudo-random number PRN-1 generated by the server system, the processing by the portable system 12 includes decoding the watermark payload, and then XOR'ing it with the secret data. If the same secret data was used by both the server system and the portable system, then this operation should reverse the XOR'ing by which the watermark payload data was generated, and yield as output the original PRN-1 number. Authentication information (e.g., the original PRN-1) number is then sent to the server 16.

When the server 16 receives this authentication information, it confirms to the server that it and the portable system share the same secret data. Based on such confirmation, the server system 16 then issues information to the target system 14 authorizing it to operate in a prescribed manner. In the case of an ATM, for example, the server 16 authorizes the ATM to conduct banking transactions with the user. (The server can also send information to the portable system, confirming that the portable system has been authenticated successfully.)

The particulars of the just-detailed process, of course, are exemplary only. For example, the mapping function by which the portable system 12 operates on the secret data and the watermark payload data to yield the authentication information, can take a great variety of forms different than the simple XOR'ing arrangement detailed.

Figure 3:
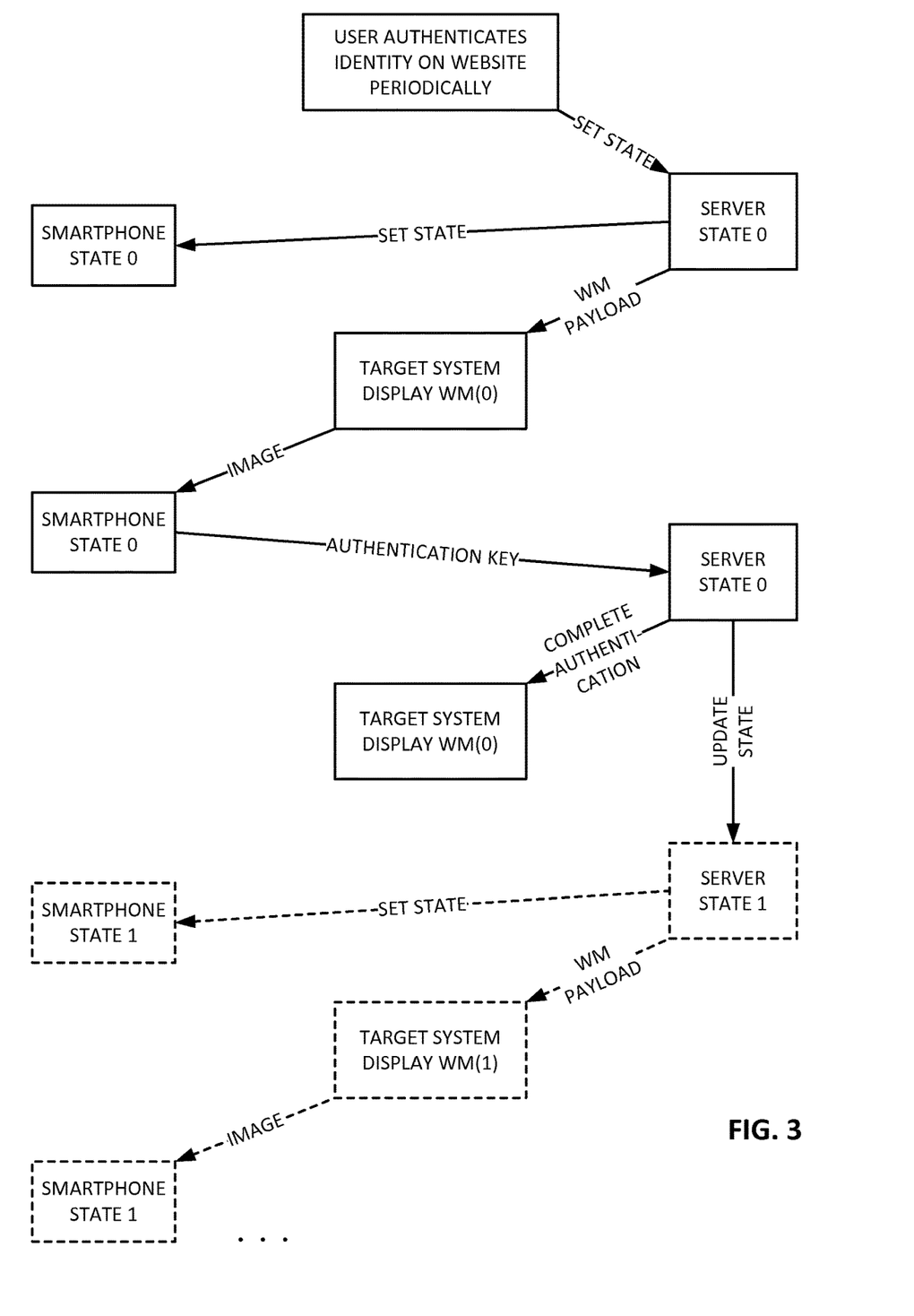

FIG. 3 is another illustration of this arrangement. FIG. 3 starts with a user (portable system) authentication process on a web site. Such processes are familiar to artisans and so are not belabored here. (They commonly involve a user entering a user name and password at a web site. In some implementations, the password is changed occasionally and is provided to the user through a channel different than the web site, e.g., a key fob that provides a password that changes with time.) Following such authentication, the server sets its state to a known value, and shares associated state information with the user's portable system (here, a smartphone).

The server next sends watermark payload information to the target system (e.g., ATM). This payload information uniquely corresponds to the state information shared by the smartphone and server.

The smartphone reads the watermark payload from imagery displayed by the ATM, applies its knowledge of the state information to the payload, and reports the results ("authentication key") back to the server.

The server then checks that the authentication data received from the smartphone corresponds—in an expected manner—with key information known only to the server. Upon confirming this fact, the server then communicates with the ATM, authorizing the user's transaction.

Also shown in FIG. 3 is that, upon concluding the just-detailed transaction, the server updates its state information (i.e., to STATE 1 at the bottom of FIG. 3). This can be done, for example, by producing a next pseudo-random number in a series defined by a seed value. The process then repeats as before, with this state information shared with the smartphone, and a watermark displayed by the ATM that corresponds to this state information, etc.

Figure 4:
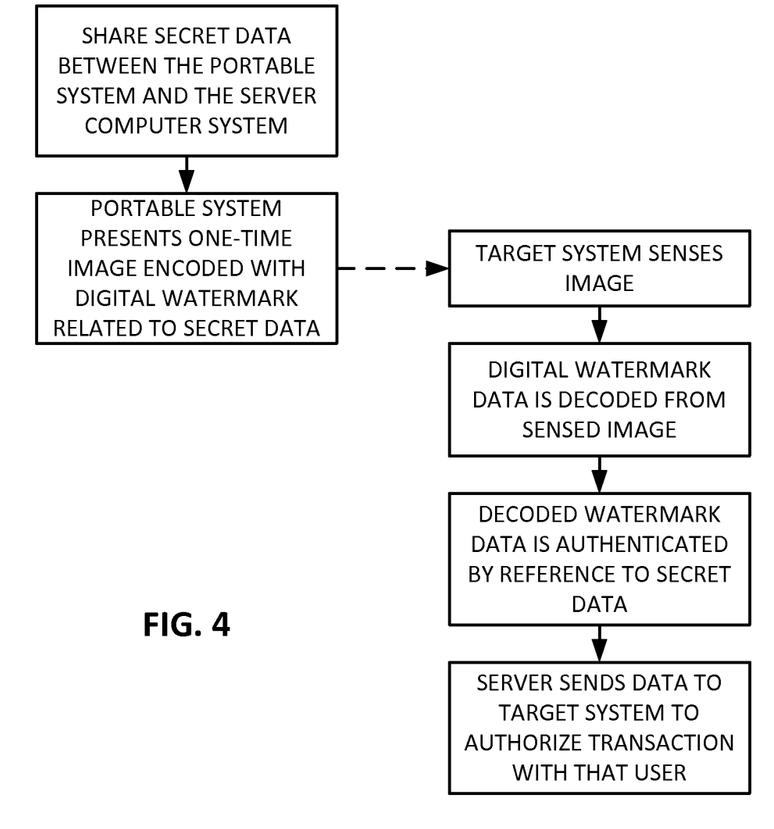
FIGS. 4 and 5 show flow charts of another illustrative method.

As noted earlier, the portable system and the target system are linked optically, by display and image sensor. While the just-described embodiment described the portable system as including the camera, the portable system can instead include the display (and the target system can include the image sensor). The latter arrangement can be used, e.g., for access control applications—such as a building door lock, or an airline boarding gate. Such a method is shown in the flowchart of FIG. 4.

This arrangement starts as before, with the portable system 12 and the server computer system 16 sharing state information. Using this state information, the portable system 12 generates a digitally-watermarked image, and displays it for reading by the target system 14.

The target system senses the image presented by the portable system. A digital watermark decoding operation then follows. (This operation can be performed by the target system, or image-related data can be sent to the server computer, which can perform the decoding operation.) Information resulting from the watermark decoding operation is then authenticated at the server computer 16, by reference to the secret data—such as detailed above. If the result of the watermark decoding operation is as-expected (based on the server state data), then the server issues a communication to the target system authorizing a transaction with the user.

Figure 5:
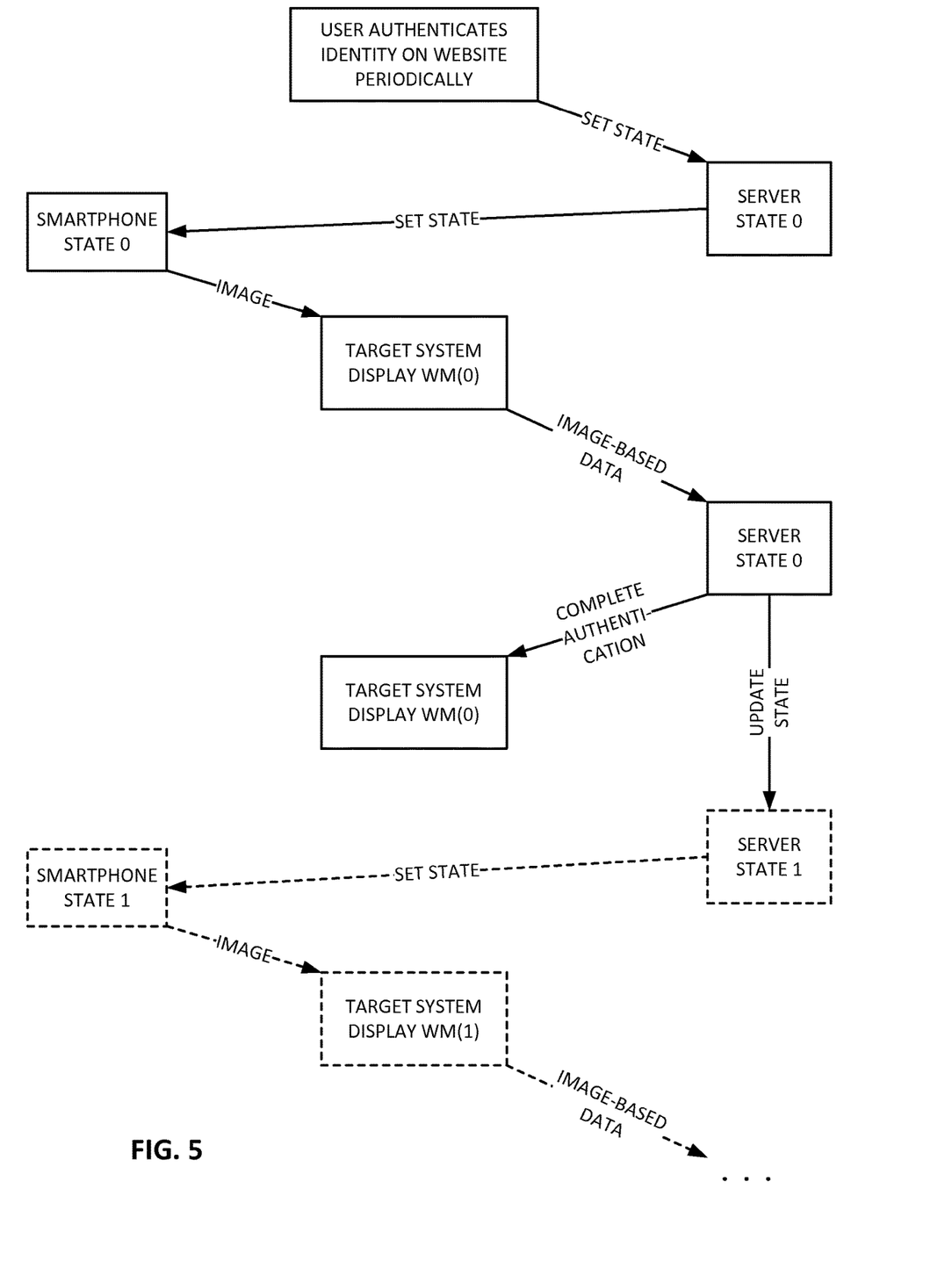

FIG. 5 is similar to FIG. 3, but illustrates the process in which the target system senses—rather than presents—the watermarked image.

It will be recognized that the detailed arrangements are not based on the security of the watermark. Even if the watermark technology is hacked, and an attacker is able to encode and/or decode watermarks of the variety used, this information does not threaten system security because authentication also requires knowledge of the shared state information.

Concluding Comments

Having described and illustrated principles of the technology with reference to illustrative embodiments, it will be recognized that the technology can be implemented in many other, different, forms.

For example, in one variant, the user presents a physical credential (e.g., a card with a magnetic stripe, RFID chip, or other identifier, or a dongle, etc.) to the target system 14, to serve as a partial transaction authorization. The target system reports this encounter to the server 16, which then synchronizes state information with the portable system of the thereby-identified user, and otherwise continues as detailed herein.

In another variant, the process starts by the target system 14 sensing a watermarked image presented by the portable system 12. The watermark data is decoded (by the target system or the server system) and serves to identify the user who wishes to engage the target system in a transaction. The server 16 then synchronizes state information with that user's portable system, and otherwise continues as detailed herein.

As noted, while the illustrative embodiments discussed target system 14 as an ATM, any system can be used as the target system. For example the target system can comprise a web browser. The web browser may be used exclusively by one user, or it may be on a system that is accessed by multiple users (in which case cookie data can store information unique to particular users).

Moreover, the target system 14 needn't be distinct from the computer system 16. For example, the target system may comprise a secure web browser running in an environment hosted by the computer system 16.

Likewise, the portable system 12 needn't be a smartphone. It can comprise a laptop, tablet, headworn- or other wearable-apparatus, etc.

While in the detailed arrangements, the state information is shared from the server computer system 16 to the portable system 12, in other embodiments the state information can be shared from the portable system to the server computer system.

Reference was repeatedly made to use of the shared state information. It will be recognized that different derivatives of such information can be shared or utilized on the different systems. Provided such derivatives yield information that can be cross-checked for authentication, then such variants are suitable for use in the detailed system.

Consider public key cryptography. In the FIG. 2/FIG. 3 arrangement, the server system 16 may provide, to the portable system 12, state information that is encrypted with the server's private key. This information can be used in its encrypted form, or it can be decrypted by the portable system using the server's public key. Encrypted information can similarly provide the basis for the watermark encoded in the image presented by the target system.

In similar fashion, all of the information exchanged between the illustrated systems can be encrypted with one key of a public key cryptography system, and decrypted with the second key.

Although not particularly detailed, it will be recognized that the various network communications involved in the foregoing transactions are desirably secured using one or more known technologies. Examples include Transport Layer Security (TLS) and Secure Sockets Layer (SSL) protocols.

While presentation of imagery is commonly done by flat panel display panel, it will be recognized that other arrangements can be used—such as through use of projection displays.

The secret information (state information) that is shared between the server and the portable system can be derived algorithmically from location information for one of the systems, and/or from time information.

In some other embodiments, digital watermarking is not used. Instead, other optical communication arrangements are employed—such as presentation and sensing of a barcode pattern, recognition of displayed text, etc.

Other features and arrangements can also be included in embodiments of the present technology. A partial listing follows:

To prevent "man in the middle" (MITM) attacks, the computer can be used merely as a relay device. A watermark, e.g., on a web page, simply identifies the address of the browser on the machine. Only phone authenticates the user via the server. The watermark payload on the computer is non-specific to a user—the login happens purely through the phone—preventing MITM & phishing attacks The website can display the image on a phone to prevent phishing attack—the same image is displayed on website during login process.

An alternative email ID of the user can be another authentication channel.

The mobile user can use a second password to sign the watermark. This may comprise a alphanumeric password or a printed watermarked image.

A similar protocol can be implemented using the smartphone compass/accelerometer/headphone jack/GPS location (e.g., user walks in a pre-determined route) for data transfer instead of a watermark. The first two limit the communication from the device to the smartphone only.

An audio watermark may be used instead of an image.

Watermarked images can be combined with Captchas (e.g., a watermarked image also depicts a Captcha). In such arrangement, the user has to identify the Captcha information and the device reads the watermark.

The transactions can additionally be conditioned upon the GPS location of the user.

A watermark payload and a shared key (between phone and server) can be combined into an alphanumeric password which the user enters into the computer/terminal to gain access.

The user may initiate a session with the server using the mobile phone; the server responds with a watermarked image that contains a one-time password. The user inputs this password to gain access, but since the password cannot be re-used, it provides protection in case the device/terminal is compromised.

A biometric (fingerprint/face/Iris/voice) reader can be added for extra security.

The design of smartphones and other computer systems referenced in this disclosure is familiar to the artisan. In general terms, each includes one or more processors (e.g., of an Intel, AMD or ARM variety), one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, a microphone, etc., together with software instructions for providing a graphical user interface), interconnections between these elements (e.g., buses), and an interface for communicating with other devices (which may be wireless, such as GSM, CDMA, W-CDMA, CDMA2000, TDMA, EV-DO, HSDPA, WiFi, WiMax, mesh networks, Zigbee and other 802.15 arrangements, or Bluetooth, and/or wired, such as through an Ethernet local area network, a T-1 internet connection, etc.).

More generally, the processes and system components detailed in this specification may be implemented as instructions for computing devices, including general purpose processor instructions for a variety of programmable processors, including microprocessors, graphics processing units (GPUs, such as the nVidia Tegra 4), digital signal processors (e.g., the Texas Instruments TMS320 series devices), etc. These instructions may be implemented as software, firmware, etc. These instructions can also be implemented to various forms of processor circuitry, including programmable logic devices, FPGAs (e.g., Xilinx Virtex series devices), FPOAs (e.g., PicoChip brand devices), and application specific circuits—including digital, analog and mixed analog/digital circuitry. Execution of the instructions can be distributed among processors and/or made parallel across processors within a device or across a network of devices.

Software instructions for implementing the detailed functionality can be readily authored by artisans, from the descriptions provided herein, e.g., written in C, C++, Visual Basic, Java, Python, Tcl, Perl, Scheme, Ruby, etc. In addition, libraries that allow mathematical operations to be performed on encrypted data can be utilized to minimize when and how sensitive information is stored in clear-text. Smartphones according to the present technology can include software modules for performing the different functions and acts.

Commonly, each of the noted systems includes operating system software that provides interfaces to hardware resources and general purpose functions, and also includes application software which can be selectively invoked to perform particular tasks desired by a user. Known browser software, communications software, and media processing software can be adapted for many of the functions detailed herein. Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which the operating system software and the application software is indistinguishable to the user (e.g., as is commonly the case in basic cell phones). The functionality detailed in this specification can be implemented in operating system software, application software and/or as embedded system software.

Some of the applicant's previous work relates to the present technology and is detailed in U.S. Pat. Nos. 6,590, 996, 8,103,877, published application 20100150434, and in pending application Ser. No. 13/978,108, filed Oct. 12, 2012, and Ser. No. 13/792,764, filed Mar. 11, 2013.

In the interest of conciseness, the myriad variations and combinations of the described technology are not cataloged in this document. Applicant recognizes and intends that the concepts of this specification can be combined, substituted and interchanged—both among and between themselves, as well as with those known from the cited prior art. Moreover, it will be recognized that the detailed technology can be included with other technologies—current and upcoming— to advantageous effect.

To provide a comprehensive disclosure, while complying with the statutory requirement of conciseness, applicant incorporates-by-reference each of the documents referenced herein. (Such materials are incorporated in their entireties, even if cited above in connection with specific of their teachings.) These references disclose technologies and teachings that can be incorporated into the arrangements detailed herein, and into which the technologies and teachings detailed herein can be incorporated. The reader is presumed to be familiar with such prior work.

I claim:

1. A method for authenticating a transaction involving three computer systems: (a) a display-equipped target system, (b) a camera-equipped portable system, and (c) a third system, and involving two items of information: (i) secret information, and (ii) digital watermark information that is based on the secret information, the target system and the third system both possessing the digital watermark information, the method including the acts:
    sharing the secret information between the portable system and said third system across a network;
    the camera of the portable system optically sensing a single-use image presented on the display of the target system, the image having been digitally-watermarked using the digital watermark information;
    producing authentication data using, as inputs: (1) visual information corresponding to the single-use image optically sensed by the camera of the portable system, and (2) the shared secret information, for use by the third computer system in authenticating a transaction involving the target system;
    wherein the transaction between the portable system and the target system is authenticated using both network communication of secret information, and optical communication of visual information.

2. The method of claim 1 that includes enabling a transaction with the target system, based on the transmitted authentication data.

3. The method of claim 2 in which the enabling includes said third computer system providing information to the target system, in response to the transmitted authentication data.

4. The method of claim 1 in which said processing and transmitting each involves use of said portable system.

5. The method of claim 1 in which said processing comprises decoding steganographically-encoded digital watermark data from the optically sensed visual data.

6. The method of claim 1 that further includes sharing new secret information between the portable system and the third computer system, following said transmitting, to prepare for a next authentication transaction.

7. The method of claim 1 in which the target system comprises an automated teller machine.

8. The method of claim 1 in which the target system comprises a component of the third computer system.

9. The method of claim 8 in which the target system comprises a web browsing system.

10. The method of claim 1 in which the portable system comprises a smartphone.

11. A method for authenticating a transaction involving three computer systems: (a) a camera-equipped target system, (b) a display-equipped portable system, and (c) a third system, and involving two items of information: (i) secret information, and (ii) digital watermark information that is based on the secret information, the portable system and the third system both possessing the digital watermark information, the method including the acts:
    sharing secret information between the third system and the target system;
    the camera of the target system optically sensing a single-use image data presented on the display of the portable system, the sensed image data depicting an image that has been digitally watermarked using the digital watermark information;
    producing authentication data using, as inputs: (1) visual information corresponding to the single-use image sensed by the camera of the target system, and (2) the shared secret information, for use by the third computer system in authenticating a transaction involving the portable system; and
    the target system receiving authentication information from the third system, across a network, based on said authentication data;
    wherein authentication of a transaction with the target system involves one-way optical communication of visual information to the target system from a portable system, and network communication of secret information and authentication information between the target system and the third system.

12. The method of claim 11 that includes performing said processing of the visual information at the target system, and transmitting the authentication data from the target system to the third system.

13. The method of claim 11 that includes performing said processing of the visual information at the third system, and earlier transmitting the visual information from the target system to the third system for processing.

14. The method of claim 1 in which the secret information comprises a seed value for a random number generator.

15. The method of claim 1 in which the secret information comprises a random number.

16. The method of claim 1 in which the digital watermark information comprises a plural-bit data payload that is a function of the secret information.

17. The method of claim 1 in which the digital watermark information comprises the secret information XORed with said authentication data.

18. A method performed by a display-equipped portable system in a transactional environment that also includes a camera-equipped target system and a third system, the target system and third system both sharing common secret information, the target system or third system using the secret information in authenticating digitally-watermarked single-use imagery optically-communicated from the display-equipped portable system and sensed by the camera-equipped target system, to authorize a transaction between the portable system and the target system;

in said transactional environment the display-equipped portable system performing acts including:
(a) receiving digital watermark information, which is based on the shared secret information, from the third computer system, communicated across a network;
(b) encoding image data with a digital watermark using the digital watermark information;
(c) presenting the digitally watermarked image data on the portable system display as said single-use imagery;

wherein the portable system is employed in authenticating a transaction with the target system, through use of network communication of the digital watermark information, and optical communication of visual information.

19. A method performed by a display-equipped target system in a transactional environment that also includes a camera-equipped portable system and a third system, the portable system and the third system both sharing common secret information, the portable system or third system using the secret information in authenticating digitally-watermarked, single-use imagery optically-communicated from the display-equipped target system and sensed by the camera-equipped portable system, to authorize a transaction between the target system and the portable system;

in said transactional environment the display-equipped target system performing acts including:
(a) receiving digital watermark information, which is based on the shared secret information, from the third computer system, communicated across a network;
(b) encoding image data with a digital watermark using the digital watermark information;
(c) presenting the digitally watermarked image data on the target system display as said single-use imagery;

wherein the target system is employed in authenticating a transaction with the portable system, through use of network communication of the digital watermark information, and optical communication of visual information.

20. A method performed by a third computer system in a transactional environment that also includes a camera-equipped portable system and a display-equipped target system, the third computer system and the portable system both sharing common secret information, the target system using digital watermark information shared across a network from the third computer system to produce a single-use digitally-watermarked image presented on the display of the target system and optically-communicated from the target system and sensed by the camera of the portable system, said captured single-use digitally-watermarked image being processed by the portable system to generate authentication data for authenticating a transaction between the portable system and the target system;

in said transactional environment the third computer system performing acts including:
(a) sharing the secret information with the portable system across the network;
(b) sharing the digital watermark information with the target system across the network;
(c) receiving the authentication data from the portable system, based on both the shared secret information and the digitally-watermarked single-use image sensed by the camera of the portable system, across the network; and
(d) transmitting authentication information to the target system across the network, based on the authentication data received from the portable system;

wherein authentication of a transaction with the target system involves one-way optical communication of visual information between the target system and the portable system, network communication of the secret information between the third system and the portable system, and network communication of the digital watermark information between the third system and the target system.

21. A method performed by a third computer system in a transactional environment that also includes a camera-equipped target system and a display-equipped portable system, the third computer system and the target system both sharing common secret information, the portable system using digital watermark information shared across a network from the third computer system to produce a single-use digitally-watermarked image presented on the display of the portable system and optically-communicated from the portable system and sensed by the camera of the target system, said captured single-use digitally-watermarked image being processed by the target system to generate authentication data for authenticating a transaction between the target system and the portable system;

in said transactional environment the third computer system performing acts including:
(a) sharing the secret information with the target system across the network;
(b) sharing the digital watermark information with the portable system across the network;
(c) receiving the authentication data from the target system, based on both the shared secret information and the digitally-watermarked single-use image sensed by the camera of the target system, across the network; and
(d) transmitting authentication information to the portable system across the network, based on the authentication data received from the target system;

wherein authentication of a transaction with the portable system involves one-way optical communication of visual information between the portable system and the target system, network communication of the secret information between the third system and the target system, and network communication of the digital watermark information between the third system and the portable system.

22. A method performed by a third computer system in a transactional environment that also includes systems "A" and "B," a first of said systems "A" and "B" being equipped with a camera, a second of said systems "A" and "B" being equipped with a display screen, the third computer system and system "A" both sharing secret information, the third computer system and system "B" both sharing other information, one of said systems encoding digital watermark data based on the secret information within imagery to produce a one-time authentication image for presentation on said display screen, and one of said systems decoding digital watermark data from a captured counterpart of said one-time authentication image that is optically-communicated from said display screen and sensed by said camera, said decoded digital watermark data being used to generate authentication data for authenticating a transaction between systems "A" and "B";

in said transactional environment the third computer system:
sharing the secret information with system "A;"
sharing the other information with system "B;" and
performing a step for generating the authentication data for authenticating the transaction between systems "A" and "B," using the secret information;

wherein authentication of the transaction between systems "A" and "B" involves one-way optical communication of visual information between systems "A" and "B," communication of the secret information between system "A" and the third system, and communication of other information between system "B" and the third system; and wherein a successful hack of the watermark does not threaten security because authentication of the transaction between systems "A" and "B" also requires use of the secret information.

* * * * *